United States Patent [19]

Hanawa et al.

[11] Patent Number: 5,301,285
[45] Date of Patent: Apr. 5, 1994

[54] DATA PROCESSOR HAVING TWO INSTRUCTION REGISTERS CONNECTED IN CASCADE AND TWO INSTRUCTION DECODERS

[75] Inventors: Makoto Hanawa; Osamu Nishii; Susumu Narita, all of Kokubunji; Kunio Uchiyama, Hachioji, all of Japan

[73] Assignee: Hitachi, Ltd., Tokyo, Japan

[21] Appl. No.: 940,762

[22] Filed: Sep. 4, 1992

Related U.S. Application Data

[63] Continuation of Ser. No. 496,448, Mar. 20, 1990, abandoned.

[30] Foreign Application Priority Data

Mar. 31, 1989 [JP] Japan .................................. 1-78221

[51] Int. Cl.⁵ ........................... G06F 9/30; G06F 9/34
[52] U.S. Cl. ...................... 395/375; 364/DIG. 1; 364/259.9; 364/262.81; 364/255.1; 364/263
[58] Field of Search ........................................ 395/375

[56] References Cited

U.S. PATENT DOCUMENTS

| | | | |
|---|---|---|---|
| 3,566,366 | 10/1968 | Quinn et al. | 364/200 |
| 4,454,578 | 6/1984 | Matsumoto et al. | 364/200 |
| 4,626,989 | 12/1986 | Torii | 364/200 |
| 4,858,105 | 8/1989 | Kuriyama et al. | 364/200 |
| 4,897,787 | 1/1990 | Kawasaki et al. | 364/200 |
| 4,954,943 | 9/1990 | Kawasaki et al. | 364/200 |
| 5,091,853 | 2/1992 | Watanabe et al. | 395/375 |
| 5,202,967 | 4/1993 | Matsuzaki et al. | 395/375 |

*Primary Examiner*—Gareth D. Shaw
*Assistant Examiner*—Kakali Chaki
*Attorney, Agent, or Firm*—Fay, Sharpe, Beall, Fagan, Minnich & McKee

[57] ABSTRACT

A data processor is provided with a first register storing a first half word of one instruction; a second register storing a second half word of the instruction; a first decoder decoding the first half word and at the same time detecting whether there exists an addressing extension portion between the first half word and the second half word; a second decoder decoding the second half word; and, a decode result generating circuit, to which a detection signal of the first decoder indicates whether the addressing extension portion exists. A decode result of the first decoder and a decode result of the second decoder are supplied to the decode result generating circuit. An extension portion register is provided to store the addressing extension portion. When the first decoder detects the addressing extension portion, the decode result generating circuit invalidates the decode result of the second decoder. On the other hand, in the case where there exists no addressing extension portion, the decode result generating circuit judges, on the basis of the detection signal, that the decode result of the second decoder is valid.

8 Claims, 2 Drawing Sheets

ADD : G R3, @(exP32, R1)

ADD : G@(exP16, R3), R1

DATA PROCESSOR HAVING TWO INSTRUCTION REGISTERS CONNECTED IN CASCADE AND TWO INSTRUCTION DECODERS

This is a continuation of application Ser. No. 07/496,448 filed Mar. 20, 1990, now abandoned.

BACKGROUND OF THE INVENTION

The present invention relates to a data processing apparatus consisting of a memory unit and a data processor processing data according to a program stored in the memory unit.

Heretofore there are known microprocessors based on the real-time operating system nucleus (hereinbelow called TRON) specification.

Since the microprocessor based on this TRON specification is a data processor formed on a semiconductor chip, it is called a TRON specification chip.

In the instruction set specification of this TRON specification chip the orthogonality (independency) of the instruction function and the addressing mode is taken into account and a memory-memory operation is possible in a general type instruction. Consequently there are two addressing fields in one instruction.

Further this general type instruction has an instruction basic portion composed of 4 bytes and an addressing extension portion of 0 to 4 bytes. The instruction basic portion is divided into a first half word and a second half word composed of 2 bytes, respectively. The first half word designates a first operand and the second half word designates a second operand and an instruction operation.

The address extension portion (0 to 4 bytes) in the first operand succeeds the first half word of the instruction basic portion and the address extension portion (0 to 4 bytes) in the second operand succeeds the second half word of the instruction basic portion.

Further the addressing field in the first half word and the addressing field in the second half word are at an identical bit position. Consequently it is possible to carry out the processing of the addressing mode and the operation of an instruction, considering the first half word and the second half word as different instructions (intermediate instructions).

The unit of this processing is called step code and an example, in which the general type instruction based on the TRON specification is carried out by dividing it into two steps, is described in Report of Technical Researches of the Electronic Information Communication Society, CPSY 87-53 (March 1987), pp. 25-30 (in Japanese).

SUMMARY OF THE INVENTION

However, in the case where one instruction is carried out, divided into two steps as described above, the two steps are required also for carrying out a simple instruction such as a register-register operation. Consequently, in order to increase the processing performance of the processor, it is necessary to carry out a simple instruction such as register-register operation by one cycle. On the contrary, this point was not taken into account in the prior art example described above.

Therefore the object of the present invention is to provide a data processor, by means of which it is possible to carry out the decoding or the operation of a simple instruction (i.e. instruction having no addressing extension portion between the first half word and the second half word, e.g. instruction for a register-register operation) and moreover no erroneous operation is produced in the decoding or the operation of a complicated instruction (i.e. instruction having an addressing extension portion between the first half word and the second half word, i.e. instruction, whose source operand is of addressing mode of register indirect).

A data processor according to a representative embodiment of the present invention executes data processing according to one instruction having at least a first half word determining the addressing mode of a first operand and a second half word determining the addressing mode of a second operand.

The present data processor can execute also data processing according to another instruction, in which an addressing extension portion of the first operand is inserted between the first half word and the second half word.

The data processor according to the representative embodiment of the present invention is provided with:

(1) a first register (124) storing information having the bit width of the first half word of one instruction;

(2) a second register (125) storing information having the bit width of the assumed second half word of the one instruction stated above;

(3) a first decoder (131) decoding the first half word stored in the first register (124) described above and at the same time detecting whether there exists an addressing extension portion between the first half word and the second half word described above or not;

(4) an assumed second decoder (132) decoding the second half word stored in the second register (125) described above; and (5) a decode result generating circuit (133) to which, (i) a detection signal (135, 137) of the first decoder (131) for indicating whether there exists the addressing extension portion, (ii) a decode result of the first decoder (131) and (iii) a decode result of the second decoder (132) are supplied, wherein the decode result of the second decoder (132) is invalidated, when the addressing extension portion stated above exists.

The first decoder (131) detects whether there exists the addressing extension portion between the first half word and the second half word described above or not and in the case where there exists the addressing extension portion, the decode result generating circuit (133) invalidates the decode result of the second decoder (132) on the basis of this detection signal (137). On the other hand, the address calculation of the first operand is executed on the basis of the addressing extension portion stored in the extension portion register (126).

In the case where there exists no addressing extension portion between the first half word and the second half word, an execution control unit (140) controls an instruction execution unit (160) so that it executes predetermined processing of the instruction, responding to the decode result of the first decoder (131) and the decode result of the second decoder (132). Further, in this case, since the first half word and the second half word are stored in the first register (124) and the second register (125), respectively, the first decoder (131) and the second decoder (132) can execute simultaneously the decode of the first half word and the decode of the second half word.

Now data processing of a general type ADD (addition) instruction of the TRON specification is considered. In addition, a case is considered where the source operand of this addition instruction is of an addressing mode of register direct and the destination operand is of an addressing mode of general purpose register indirect with word offset is considered. The form of this addition instruction consists of (1) the first half word, (2) the second half word, and (3) the word offset for the destination operand. Consequently the first half word and the second half word are stored in the first register (124) and the second register (125), respectively.

The procedure, by which the data processor executes the addition instruction stated above, will be explained, by the following steps of the procedure.

(1) The first decoder (131) and the second decoder (132) decode simultaneously the first half word at the heading of this addition instruction and the assumed second half word succeeding it, respectively.

(2) As the result of the decode of the first half word, the source operand (first operand) is of an addressing mode of register direct and it can be understood that the information succeeding the first half word is not the addressing extension portion but it is the second half word. That is, it is detected by the first decoder (131) that there exists no addressing extension portion between the first half word and the second half word and the detection signal (135) indicating it is outputted by the first decoder (131).

On the other hand, as the result of the decode of the second half word, it can be understood that this instruction is an ADD (addition) instruction and that the destination operand is of an addressing mode of general purpose register indirect with word offset.

(3) The address of the designation operand is calculated and an operand fetch of the second operand is executed.

(4) Addition of the first and second operand is executed and the calculation result is stored in the destination.

As described above, in the case where the source operand is of an addressing mode of register direct, since the address calculation of the source operand and the fetch of the source operand can be omitted, it is possible to increase the speed of the execution of the instruction.

On the other hand, in the case where there exists the addressing extension portion of the source operand, succeeding the first half word, in Step (2) stated above, the first decoder (131) detects it and outputs the detection signal (137). The decode result generating circuit (133) invalidates the decode result (136) of the second decoder (132) described above on the basis of this detection signal (137).

In this way, the decode result of the second decoder (132) decoded at the same time as the decode of the first decoder (131) is invalidated. Thereafter, the decode of the instruction is terminated by detecting the true second half word and decoding it by means of the second decoder (132). Consequently, even if information succeeding the first half word is decoded in the second decoder (132), no erroneous operations occur.

DESCRIPTION OF THE PREFERRED EMBODIMENTS

Figure 1:
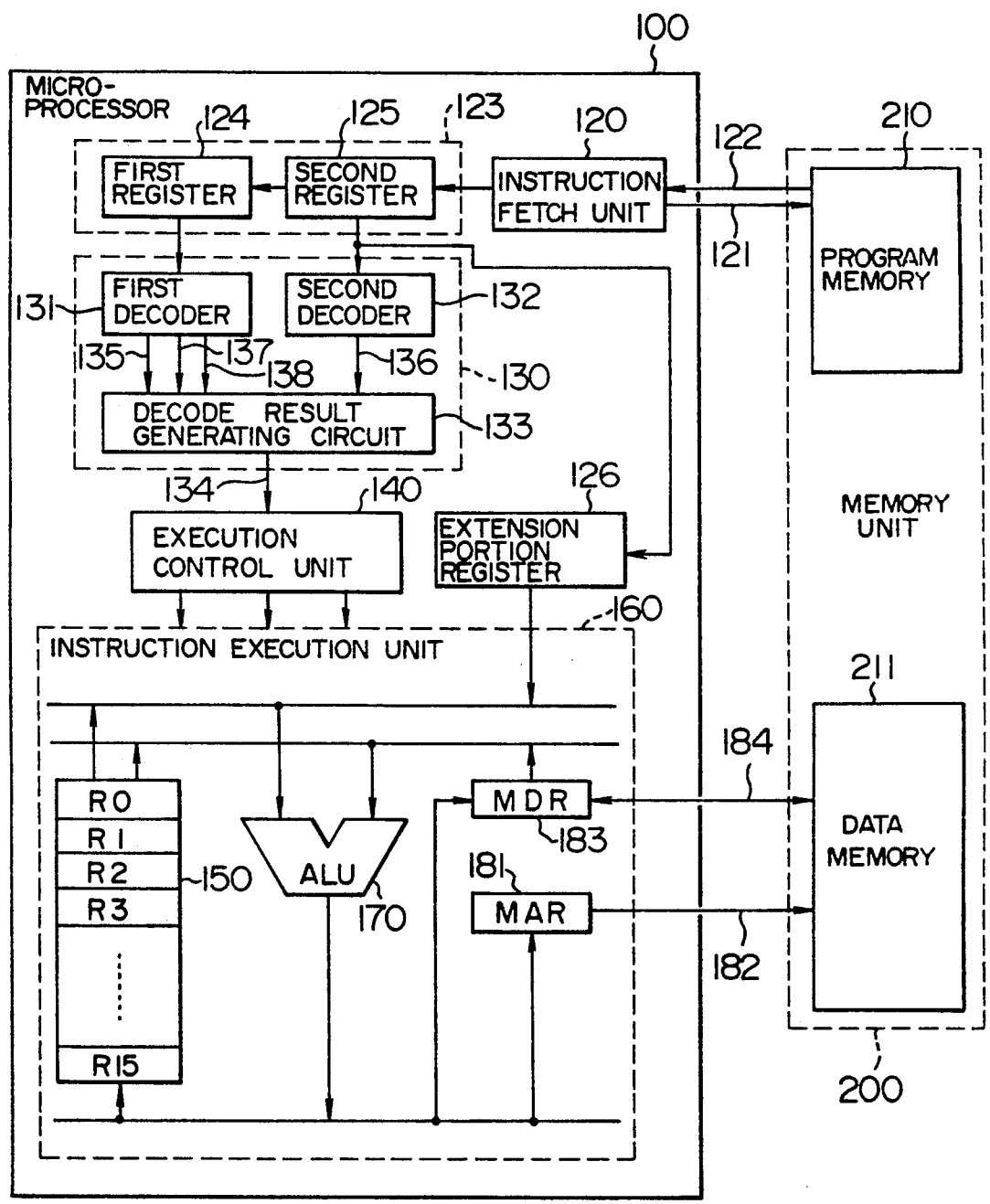
FIG. 1 is a block diagram showing a data processing apparatus according to an embodiment of the present invention.

Hereinbelow an embodiment of the present invention will be explained in detail, referring to the drawings.

FIG. 1 is a block diagram of a data processing apparatus, which is an embodiment of the present invention. This data processing apparatus consists of a memory unit 200 and a data processor 100 processing data according to a program stored in the memory unit 200.

The memory unit 200 consists of a program memory unit 210 storing instructions of the program and a data memory unit 211 storing data. Concretely speaking, this memory unit comprises a main memory and a cache memory. According to circumstances this cache memory can be omitted.

The data processor 100 is a microprocessor formed on a semiconductor chip and it is described that the cache memory stated above is arranged on the same chip as this microprocessor 100.

The microprocessor 100 reads-out instructions from the program memory unit 210 and processes data stored in the data memory 211.

The microprocessor 100 consists of an instruction fetch unit 120, an instruction prefetch register 123, an instruction decoder 130, an execution control unit 140, an instruction execution unit 160 and an extension portion register 126.

The instruction fetch unit 120 outputs instruction addresses by bus 121 to the program memory 210 and reads-out instructions through an instructing reading-out bus 122. The read-out instructions are set in the instruction register 123. Further, in the case where information of an instruction read-out from the program memory 210 is an extension portion of the addressing mode such as address displacement or immediate value, the information in this extension portion is set in the extension portion register 126.

The instruction prefetch register 123 consists of a first register 124 and a second register 125. The heading half word of the instruction in a machine language program fetched by the instruction fetch unit 120 is set in the first register 124 and the succeeding assumed half word thereof is set in the second register 125.

For the data processing apparatus in the present embodiment a data set of 32 bits (4 bytes) is called a word and a data set of 16 bits (2 bytes) is called a half word.

The instruction decoder 130 consists of a first decoder 131, a second decoder 132 and a decode result generating circuit 133.

The first decoder 131 decodes the first half word of the instruction stored in the first register 124 and at the same time it detects whether that instruction is a general type instruction having an addressing extension portion or not. In the case where that instruction is a general type instruction having no addressing extension portion, a signal 135 is outputted by the first decoder 131. On the other hand, in the case where that instruction is a general type instruction having an addressing extension portion, another signal 137 is outputted by the first decoder 131. The first decoder 131 detects further whether the instruction is an instruction of a short format type having no second half word or not. In the case where that instruction is an instruction of a short format type, a signal 138 is outputted by the first decoder 131.

The decode results other than the detection signals 135, 137 and 138 described above are transmitted from the first decoder 131 to the decode result generating circuit 133, although this is not indicated in FIG. 1.

The second decoder 132 decodes the assumed half word (i.e. information other than the first half word) stored in the second register 125 and determines the sort of the general type instruction and the content of the extension mode addressing.

The decode result generating circuit 133 generates the final decode result 134 by using the decode results of the first decoder 131, the detection signals 135, 137 and 138 of the first decoder 131 and the decoder result 136 of the second decoder 132, and transmits this final decode result 134 to the execution control unit 140.

If, when the first decoder 131 effects the decoding, the succeeding assumed is set already in the second register 125, the second decoder 132 decodes simultaneously the half word set in the second register 125.

Receiving the final decode result 134 described above, the execution control unit 140 generates control signals for controlling the internal operation of the instruction execution unit 160.

The instruction execution unit 160 consists of a register file 150 (general purpose register consisting of 16 registers R0, R1, R2, R3, . . . , R15), an operation unit (Arithmetic Logic Unit) ALU 170, a memory address register MAR 181 and a memory data register MDR 183.

The operation unit ALU 170 executes calculation of the effective address of the operand and data processing (operation) designated by the instruction. It is possible also for the calculation of the effective address of the operand and the data processing (operation) designated by the instruction to be executed in different operation unit (ALU's).

When the operation data on the data memory 211 are fetched, the address for the operand fetch is set in a memory address register MAE 181. The data memory 211 is accessed by an address signal through an operand address bus 182 and the fetched data is set in a memory data register MDR 183 through another operand data bus 184.

Figure 2:
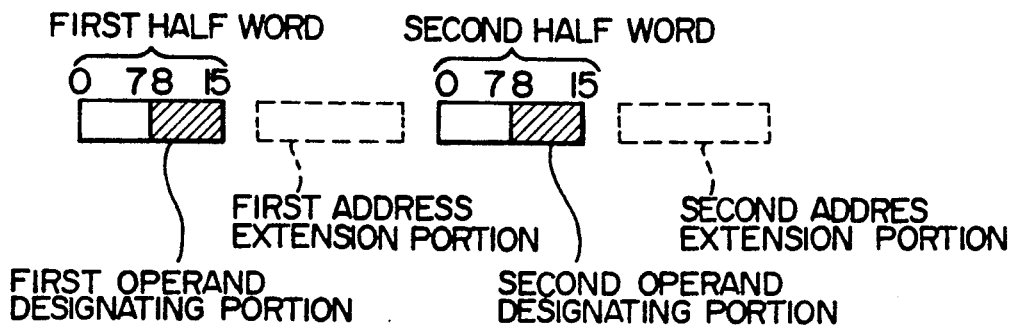
FIG. 2 shows a format of an instruction, which a data processing apparatus according to an embodiment of the present invention executes.

FIG. 2 shows a format of the instruction executed by the data processing apparatus in the present embodiment.

As indicated in FIG. 2, one instruction basically has the first half word of 16 bits and the second half word of 16 bits.

The first half word designates the source operand and the second half word designates the destination operand and the operation of the instruction.

According to circumstances an addressing extension portion of 16 or 32 bits may succeed the first half word. Further, in the case where the addressing mode is an extension mode, several additional half words of 16 bits are inserted before the second half word. Another addressing extension portion of 16 or 32 bits may succeed also the additional half word.

Similarly still another addressing extension portion of 16 or 32 bits may succeed the second half word. Further, in the case where the addressing mode is an extension mode, several additional half words are inserted before the first half word of the succeeding instruction. Still another addressing extension portion of 16 or 32 bits may succeed also the additional half word.

As an example of the operation, the internal operation of the data processing apparatus will be explained for an instruction, by which the content of the general purpose register R3 in the register file 150 is added to the content of the memory and the result of the addition is stored in the same memory.

ADD: G R3 @ (exp 32, R1)

This addition instruction can be decomposed into the first half word, the second half word, and the addressing extension portion of the destination operand.

Figure 3:
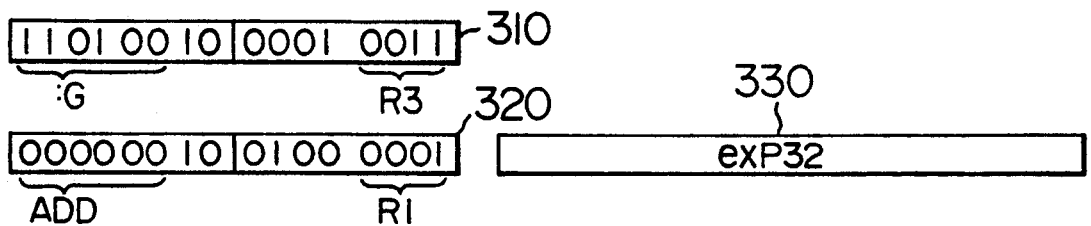
FIGS. 3 and 4 represent different concrete examples of the instruction, which data processing apparatus according to an embodiment of the present invention executes.

FIG. 3 shows the bit pattern of this addition instruction.

That is, the first field of the first half word 310 indicates that this instruction is a general type instruction (:G) having a second half word and the second field of the first half word 310 indicates that the first operand (source operand) is the content of the general purpose register R3 (i.e. addressing mode of register direct).

On the other hand, the first field of the second half word 320 indicates that the operation of the instruction is an addition (ADD) and the second field of the second half word 320 indicates that the second operand (destination operand) is the content of the memory (i.e. addressing mode of register indirect), whose address is the sum of the content of the general purpose register R1 of the register file 150 and a succeeding displacement 330 of 32 bits.

Hereinbelow the different steps of the operation of the microprocessor 100 will be explained in detail.

(1) The first decoder 131 decodes the first half word 310 of 16 bits set in the first register 124. By this decoding it is understood that the information set in the first register 124 from the information in the first field of this first half word 310 is the first half word of a general type instruction and from the information in the second field of the first half word 310 it is understood that the source operand is of an addressing mode of register direct and that there exists no addressing extension portion. Consequently the signal 135 is outputted by the first decoder 131.

On the other hand, the second decoder 132 decodes the assumed second half word 320 of 16 bits set in the second register 125. If this assumed half word set in the second register 125 is the true second half word of the instruction, by this decoding it is understood that the instruction set in the registers 124 and 125 from the information in the first field of this second half word 320 is an ADD (addition) instruction and that the destination operand is an addressing mode of register indirect with a displacement of 32 bits. In this way, the decoder result 136 is outputted by the second decoder 132.

Since the decode result generating circuit 133 judges by the signal 135 that there exists no addressing extension portion, i.e., that the signal of the decode result 136 from the second decoder 132 is valid, this decode result 136 is transmitted to the execution control unit 140.

In this way the decode result generating circuit 133 generates the final decode result 134 by using the decoder result of the first decoder 131, the detection signals 135, 137 and 138 of the first decoder 131 and the decode result 136 of the second decoder 132, and this final decode result 134 is transmitted to the execution control unit 140.

During one bus cycle, the first half word 310 and the second half word 320 of this addition instruction are set in the first half register 124 and the second register 125, respectively, through the instruction reading-out bus, whose bus width is 32 bits and the instruction fetch unit 120 fetching a signal having a width of 32 bits. Further, since the first decoder 131 and the second decoder 132 decode simultaneously the first half word 310 and the second half word 320, respectively, the speed of the fetch and the decode is considerably increased.

(2) The instruction execution unit 160 calculates the address of the destination operand according to the indication of the final decode result sent on bus 134 to the execution control unit 140.

Prior thereto, during the succeeding bus cycle the 32-bit displacement 330 in the addressing extension portion is read-out from the program memory 210 through the instruction reading-out but, whose bus width is 32 bits, and the instruction fetch unit 120 fetching a signal having a width of 32 bits.

At first, the 32-bit displacement 330 in the read-out addressing extension portion which is in the second register 125 is set in the extension portion register 126 and the ALU 170 adds the general purpose register R1 to the 32-bit displacement in the extension portion register 126.

(3) The operand is fetched according to the operand address obtained by the address addition described above. At first, the address calculated by the ALU 170 is set in the memory address register MAR 181 and the data memory 211 is accessed. The read-out data is set in the memory data register MDR 183.

(4) The operand set in the memory data register MDR 183 is added to the content of the general purpose register R3 in the ALU 170 the result thus obtained is set in the memory data register MDR 183 and stored in the data memory 211. At this time, the store address is the same address as the address, which has fetched the operand immediately before.

The instruction is executed, as described above.

As another example of the operation, the internal operation will be explained for an instruction, by which the content of the memory is added to the content of the register R1 and the result of the addition is stored in the register R1:

ADD: G @ (exp 16, R3), R1

Figure 4:
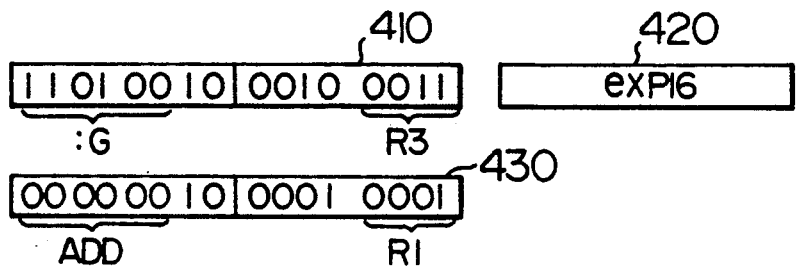

This instruction can be decomposed into the first half word, the addressing extension portion of the source operand and the second half word. FIG. 4 shows the bit pattern of this instruction. The first field of the first half word 410 indicates that this instruction is a general type instruction (:G) having a second half word and the second field of the first half word 410 indicates that the first operand (source operand) is the content of the memory, whose address is the sum of the content of the general purpose register R3 and the succeeding 16-bit displacement 420.

On the other hand, the first field of the second half word 430 indicates that the operation of this instruction is an addition (ADD) and the second field of the second half word 430 indicates that the second operand (destination operand) is the content of the general purpose register R1.

Hereinbelow the different steps of the operation of the microprocessor will be explained in detail.

(1) The first half word 410 of 16 bits and the extension portion 420 of 16 bits are read-out from the program memory 210 during one bus cycle and set in the first register 124 and the second register 125, respectively.

The first decoder 131 decodes the first half word 410 set in the first register 124. From this decode result it is understood that the set instruction is the first half word of a general type instruction, that the source operand is of an addressing mode of register indirect with 16-bit displacement and that there exists a 16-bit addressing extension portion 420.

Consequently the first decoder 131 outputs a detection signal 137 indicating the presence of the addressing extension portion 420.

On the other hand, since the second decoder 132 decodes the addressing extension portion 420 set in the second register 125, it obtains a meaningless decode result 136. The signal 137 indicates the presence of the addressing extension portion 420, the decode result generating circuit 133 judges that the decode result 136 of the assumed second half word is invalid an transmits the decode result obtained only by the first half word to the execution control unit 140 as the decode result signal 134.

(2) The instruction execution portion 160 calculates the address of the source operand according to the indication (decode result signal 134) of the execution control unit 140.

The 16-bit displacement 420 of the addressing extension portion set in the instruction register 125 is set at the same time in the extension portion register 126.

Consequently the ALU 170 adds the general purpose register R3 to the 16-bit displacement of the extension portion register 126.

(3) The operand is fetched according to the operand address obtained from the result of the addition described above.

The address obtained by the addition in the AL 170 is set in the memory address register MAR 181 and the data memory 211 is accessed during the succeeding bus cycle.

The data read-out during this bus cycle is set in the memory data register MDR 183.

(4) The succeeding half word 430 is fetched from the program memory 210 during the next succeeding bus cycle and the addressing extension portion 420 of the source operand is removed from the instruction prefetch register 123 by setting the half word 430 in the second register 125.

Consequently it is understood that this fetched half word 430 is the second half word of the instruction. That is, the second half word 430 is set in the second register 125 and decoded by the second decoder 132. As a result, it is understood that the operation of the instruction is an instruction of ADD (addition) and that the destination operand is of addressing mode of register direct. This decode result is transmitted to the decode result generating circuit 133 as the decode result signal 136.

Since it is previously known from the decode result of the first half word that the signal 136 is the true decode result of the second half word, the decode result generating circuit 133 judges that the signal 136 is valid and transmits this decode result signal 136 to the execution control unit 140 as the signal 134.

(4) The instruction execution unit 160 executes the operation of the instruction according to the indication of the decode signal 134 of the execution control unit 140.

That is, the ALU 170 adds the operand set in the memory data register MDR 183 to the content to the general purpose register R1 and stores the result of the addition in the general purpose register R1.

The execution of the instruction having the addressing extension portion between the first half word and the second half word is finished, as described above.

Now the execution of a simple instruction having no addressing extension portion between the first half word and the second half word will be explained.

An example of this simple instruction is an instruction of the register-register operation, e.g. an instruction as described below:

ADD: G R3, R1

This instruction is one, by which the two contents of the general purpose registers R3 and R1 in the register file 150 are added and the result of this addition is stored in the general purpose register R1.

This simple addition instruction is decomposed only into the first half word and the second half word.

That is, the first field of the first half word indicates that this instruction is a general type instruction (:G) having a second half word and the second field of the first half word indicates that the first operand (source operand) is the content of the general purpose register R3 (i.e. addressing mode of register direct).

Further, the first field of the second half word indicates that the operation of the instruction is an addition (ADD) and the second field of the second half word indicates that the second operand (destination operand) is the content of the general purpose register R1 in the register file 150 (i.e. addressing mode of register direct).

Hereinbelow the different steps of the operation of the microprocessor 100 will be explained in detail.

(1) The first decoder 131 decodes the first half word 310 of 16 bits set in the instruction register 124. By this decoding it is understood that the information set in the first register 124 from the information in the first field of this first half word is the first half word of a general type instruction and from the information in the second field of the first half word it is understood that the source operand is of an addressing mode of register direct and that there exists no addressing extension portion. Consequently the signal 135 is outputted by the first decoder 131.

On the other hand, the second decoder 132 decodes the assumed second half word of 16 bits set in the instruction register 125. If this half word set in the instruction register 125 is the true second half word of the instruction, by this decoding it is understood that the information set in the registers 124 and 125 from the information in the first field of this second half word is an ADD (addition) instruction and that it is of an addressing mode of register direct. In this way, the decode result 136 is outputted by the second decoder 132.

Since the decoder result generating circuit 133 judges, by the signal 135 that there exists no addressing extension portion, i.e., that the signal of the decoder result 136 from the second decoder 132 is valid, this decode result 136 is transmitted to the execution control unit 140.

In this way the decode result generating circuit 133 generates the final decode result 134 by using the decode result of the first decoder 131, the detection signals 135, 137 and 138 of the first decoder 131 and the decode result 136 of the second decoder 132 and this final decode result 134 is transmitted to the execution control unit 140.

On the other hand, during one bus cycle, the first half word and the second half word of this simple addition instruction are set in the first register 124 and the second register, respectively, through the instruction reading-out bus, whose bus width is 32 bits, and the instruction fetch unit 120 fetching a signal having a width of 32 bits. Further, since the first decoder 131 and the second decoder 132 decode simultaneously the first half word and the second half word, respectively, the speed of the fetch and the decode is considerably increased.

(2) The instruction execution unit 160 adds the two contents of the general purpose registers R3 and R1 according to the indication of the final decode result 134 of the execution control unit 140 and stores the result of the addition stated above again in the general purpose register R1.

Since these addition operation and storing operation are executed during one cycle, it is possible to increase the speed of the execution processing for this simple addition instruction.

Although explanation was made in the above examples for the case where, when the first half word (310 or 410) is decoded, the succeeding assumed half word (320 or 420) is set already in the second register 125, if the prefetch of the instruction to register 12 is not in time, only the first half word is decoded. When as the result of the decode of the first half word it is a general type instruction having no addressing extension portion, the second half word is decoded, waiting for the termination of the prefetch and the execution of the instruction is started thereafter. On the other hand, when as the result of the decode of the first half word it is a general type instruction having an addressing extension portion, the fetch of the source operand is started without waiting for the decode of the second half word and it is sufficient for the decode of the second half word to be terminated, before the fetch of the source operand is terminated.

According to the above embodiment, since it is sufficient for the first decoder to decode only the heading half word of the instruction and further for the second decoder to decode only the second half word of the instruction and the extension portion of the extension mode addressing, the function of the decoder can be reduced and in the case where the decoder is constructed by a PLA (programmable logic array), an effect can be obtained that the area required for the mounting is reduced and the operation speed is increased.

As described above, according to the present invention, since the first half word and the second half word can be decoded simultaneously, in the case where the first half word has no extension portion, it is possible to increase the speed of the execution of the instruction.

What is claimed is:

1. A data processor capable of executing data processing according to a first instruction having a first half word determining the addressing mode of a first operand and a second half word determining the addressing mode of a second operand, in which no address extension portion is inserted between said first half word and said second half word and also executing data processing according to a second instruction, in which an address extension portion is inserted between a first half word thereof and a second half word thereof, said first half word and said second half word of said second instruction determining a first operand and a second operand of said second instruction, respectively, the data processor comprising:

(1) a first store unit;

(2) a second store unit, said fist store unit and said second store unit storing, simultaneously, said first half word and said second half word of said first instruction when said first instruction is to be executed, and storing, simultaneously, said first half word and said address extension portion of said second instruction when said second instruction is to be executed, said second store unit further storing the second half word of the second instruction at a time period subsequent to the storing of the address extension portion;

(3) a first decoder for decoding, the contents of said first store unit and for detecting whether an instruction, the first half word of which is stored in said first store unit, has an address extension portion following the first half word;

(4) a second decoder for decoding, the contents of said second store unit substantially simultaneous with the decoding of the contents of said first store unit, said first decoder unit and said second decoder unit decoding, simultaneously, said first half word and said second half word of said first instruction stored in said first store unit and said second store unit when said first instruction is to be executed and decoding, simultaneously, said first half word and said address extension portion of said second instruction stored in said first store unit and said second store unit, and said second decoder decoding the second half word of the second instruction at a time period subsequent to the decoding of the address extension portion when said second instruction is to be executed;

(5) a decode result generating circuit, arranged to receive a decode result of said first decoder, a simultaneous decoder result of said second decoder and a detection signal of said first decoder, the detection signal indicating whether said instruction, said first half word of which is stored in said first store unit, has said address extension portion following said first half word, the decode result generating circuit further including (i) an invalidating means arranged to invalidate the simultaneous decode result of said second decoder when the detection signal of said first decoder indicates that said instruction, said first half word of which is stored in said first store unit, has said addressing extension portion following said first half word, and (ii) a validating means arranged to validate the simultaneous decode result of said second decoder when the detection signal of said first decoder indicates that the instruction, said first half word of which is stored in said first store unit has no address extension portion, whereby a complete substantially simultaneous decoding of the first half word and the second half word of the first instruction is achieved, producing a final decode result, the decode result generating circuit further arranged to receive the decode result of said second half word of said second instruction subsequent to the decoding of said address extension portion;

(6) an execution control unit coupled to said decode result generating circuit to receive (i) a result of the decoding of the first half word of said second instruction from said first decoder when the simultaneous decode result of said address extension portion of the second decoder is invalidated, to receive (ii) a result of the decoding of the second half word of said second instruction from said second decoder subsequent to the decoding and the invalidation of the simultaneous decode result of said address extension portion, and to receive (iii) the final decode result based upon said complete substantially simultaneous decoding of the first half and the second half word of the first instruction when the simultaneous decode result of the second half word is validated; and (7) an instruction execution unit whose operation is controlled by the decoding results of the first half word and the second half word of said second instruction and the final decode result of said first instruction received by the execution control unit.

2. A data processor according to claim 1, further comprising:

(8) an extension portion store unit, an input of which is coupled with an output of said second store unit, said extension portion store unit storing said address extension portion which is also stored in the second store unit, and wherein said instruction execution unit includes an arithmetic logic unit an input of which is coupled with an output of said extension portion store unit; and wherein when said instruction is the second instruction having said address extension portion, said instruction execution unit executes address calculation of said arithmetic logic unit on a basis of said addressing extension portion stored in said extension portion store unit.

3. A data processor according to claim 2 further comprising:

a means for activating said second decoder to begin decoding the information stored in said second store unit substantially at the same time as said first decoder begins to decode the information stored in said first store unit.

4. A data processor according to claim 2, wherein said instruction execution unit includes a plurality of general purpose registers;

wherein in a case where said instruction, has no addressing extension portion, the output of said decode result generating circuit controls the operation of said instruction execution unit in response to the detection signal indicating the absence of addressing extension portion from the first decoder, the decode result of said first decoder and the decode result of said second decoder said instruction execution unit adds the contents of two registers selected from said plurality of general purpose registers, the result thus obtained by the addition being stored in one of the selected two registers.

5. A data processor according to claim 1 wherein said complete substantially simultaneous decoding of the first half word and the second half word occur in one bus cycle.

6. A data processor according to claim 1 further comprising:

(8) an extension portion store unit storing an address extension portion inserted between said first half word and said second half word.

7. A data processing apparatus for processing an instruction having (i) a construction of a first half word and second half word immediately adjacent each other or (ii) a construction of an address extension portion interposed between a first half word and a second half word, the data processing apparatus comprising:

first store means configured for storing the first half word of the instruction;

second store means for (i) storing the second half word simultaneously with the storing of the first half word by the first store means when the construction of the instruction has the first half word and second half word immediately adjacent, for (ii) storing the address extension portion simultaneously with the storing of the first half word by the first store means when the construction of the instruction ha the address extension portion interposed between the first half word and the second half word, and for (iii) storing the second half word of the instruction having the address extension portion, subsequent to the storing of the address extension portion;

first decoder means for receiving and decoding the first half word from the first store means, the first decoder means including a detecting means for detecting, from the first half word, whether the instruction is constructed with the address extension portion interposed between the first half word and the second half word;

second decoder means configured (i) to receive and decode, from the second store means one of the second half word and the address extension portion, substantially simultaneous with the decoding of the first half word stored in said first store means and (ii) to receive and decode from the second store means the second half word of the instruction, including the address extension portion, subsequent to the decoding of the address extension portion;

a detection signal generating means, in data communication with the first store unit, for generating a detection signal based on the detection achieved by the means for detecting;

a decode result generating circuit, arranged to receive a decode result of the first decoder, a decode result of the second decoder and the detection signal from the detection signal generating means, the decode result generating circuit further including invalidating means to invalidate the simultaneous decode result of said second decoder when the detection signal indicates the instruction has the address extension portion between the first half word and the second half word, and validating means to validate the simultaneous decode result of the second decoder when the detection signal indicates the instruction has the first half word immediately adjacent the second half word, whereby a complete substantially simultaneous decoding of the instruction constructed with the first half word immediately adjacent the second half word is achieved, producing a final decode result, the decode result generating circuit further arranged to received the decode result of the second half word of the instruction having the address extension portion, subsequent to the decoding of the address extension portion;

an execution control unit coupled to said decode result generating circuit to receive (i) a result of the decoding of the fist half word of an instruction constructed having the address extension portion interposed between the first half word and the second half word, when the decode result of the second decoder is invalidated, (ii) a result of the decoding of the second half word from said second decoder, of said instruction having the address extension portion interposed between the first half word and the second half word, subsequent to the invalidation of simultaneous decode result of said address extension portion and (iii) the final decode result based upon said complete substantially simultaneous decoding of the first half word and the second half word of said instruction having the construction of the first half word and second half word immediately adjacent each other, when the decode result of the second half word is validated; and, an instruction execution unit whose operation is controlled by the final decode result of the instruction having the first half word and the second half word immediately adjacent each other and the decode result of the first half word and the decode result of the second half word of the instruction having the address extension portion, generated by the execution control unit.

8. A data processing method for processing an instruction having (i) a construction of a first half word and second half word immediately adjacent each other or (ii) a construction of an address extension portion interposed between a first half word and a second half word, the data processing method comprising:

storing the first half word of the instruction in a first store means;

storing in a second store means (i) the second half word of the instruction when the construction of the instruction has the first half word and second half word immediately adjacent, and (ii) the address extension portion when the construction of the instruction has the address extension portion interposed between the first half word and the second half word;

receiving and decoding in a first decoder means the first half word from the first store means;

receiving and decoding in a second decoder means one of the second half word and the address extension portion from the second store means, substantially simultaneous with the decoding of the first half word;

detecting by a detection means included in the first decoder means whether the instruction is constructed with the address extension portion interposed between the first half word and the second half word;

generating, by a detection signal generating means, a detection signal based on the detection achieved by the detection means;

receiving in a decode result generating circuit a decoder result of the first decoder, a decode result of the second decoder and the detection signal from the detection signal generating means;

invalidating the decode result of said second decoder when the detection signal indicates the instruction has the address extension portion between the first half word and the second half word;

validating the decode result of the second decoder when the detection signal indicates the instruction has the first half word immediately adjacent the second half word, whereby a complete substantially simultaneous decoding of the instruction constructed with the first half word immediately adjacent the second half word is achieved, producing a final decode result;

receiving in an execution control unit coupled to said decode result generating circuit (i) a result of the decoding of the first half word of the instruction having the address extension portion interposed between the first half word and the second half word, when the decode result of the address extension portion of the second decoder is invalidated, and (ii) the final decode result based upon said substantially simultaneous decoding of the first half word and the second half word of the instruction having the first half word and the second half word immediately adjacent each other, when the decode result of the second half word is validated;

setting the second half word of the instruction including the address extension portion, in the second store means, thereby replacing the address extension portion;

decoding, in the second decoder means, the second half word which replaced the address extension portion in the second store means;

receiving, in the decode result generating circuit, a decode result of the second decoder, based on the second half word which replaced the address extension portion;

receiving in the execution control unit the decode result of the instruction having the address extension portion; and operating an instruction execution unit in response to the final decode result of the instruction having the first half word and the second half word immediately adjacent each other and the decode results of the first half word and the second half word of the instruction having the address extension portion, generated the execution control unit.

* * * * *

UNITED STATES PATENT AND TRADEMARK OFFICE
CERTIFICATE OF CORRECTION

PATENT NO. : 5,301,285
DATED : April 5, 1994
INVENTOR(S) : Makoto Hanawa, et al.

It is certified that error appears in the above-indentified patent and that said Letters Patent is hereby corrected as shown below:

Claim 1, column 11, line 1, delete "fist" and substitute therefor --first--.

Claim 1, column 11, line 35, delete first occurrence of "decoder" and substitute therefor --decode--.

Claim 1, column 11, line 46, delete "addressing" and substitute therefor --address--.

Claim 7, column 13, line 11, delete "ha" and substitute therefor --has--.

Claim 7, column 13, line 57, delete "received" and substitute therefor --receive--.

Claim 7, column 13, line 63, delete "fist" and substitute therefor --first--.

Claim 8, column 14, lines 52-53, delete "decoder" and substitute therefor --decode--.

Signed and Sealed this

Second Day of August, 1994

*Attest:*

BRUCE LEHMAN

*Attesting Officer*    Commissioner of Patents and Trademarks